(12) United States Patent
Baumhof

(10) Patent No.: US 8,312,520 B2
(45) Date of Patent: Nov. 13, 2012

(54) METHODS AND SYSTEMS TO DETECT ATTACKS ON INTERNET TRANSACTIONS

(75) Inventor: Andreas Baumhof, Cronulla (AU)

(73) Assignee: Symbiotic Technologies Pty Ltd, Artarmon (AU)

( * ) Notice: Subject to any disclaimer, the term of this patent is extended or adjusted under 35 U.S.C. 154(b) by 0 days.

(21) Appl. No.: 13/283,132

(22) Filed: Oct. 27, 2011

(65) Prior Publication Data

US 2012/0198528 A1 Aug. 2, 2012

(30) Foreign Application Priority Data

Feb. 1, 2011 (AU) ................................ 2011200413

(51) Int. Cl.
*G06F 17/30* (2006.01)
(52) U.S. Cl. ................ 726/6; 726/14; 726/26; 713/170; 713/188; 713/189
(58) Field of Classification Search ........................ None
See application file for complete search history.

(56) References Cited

U.S. PATENT DOCUMENTS

| | | | | |
|---|---|---|---|---|
| 7,069,434 | B1* | 6/2006 | Ilnicki et al. ................... | 713/153 |
| 8,185,457 | B1* | 5/2012 | Bear et al. ......................... | 705/35 |
| 2002/0194501 | A1* | 12/2002 | Wenocur et al. ............... | 713/201 |
| 2003/0208684 | A1* | 11/2003 | Camacho et al. .............. | 713/186 |
| 2004/0255137 | A1* | 12/2004 | Ying ............................... | 713/193 |
| 2007/0033642 | A1* | 2/2007 | Ganesan et al. ................. | 726/10 |
| 2008/0052775 | A1* | 2/2008 | Sandhu et al. ................... | 726/14 |
| 2008/0091590 | A1* | 4/2008 | Kremen ........................... | 705/38 |
| 2010/0162393 | A1 | 6/2010 | Sobel et al. | |
| 2010/0287132 | A1* | 11/2010 | Hauser .............................. | 706/52 |
| 2011/0131415 | A1* | 6/2011 | Schneider ..................... | 713/171 |
| 2011/0307703 | A1* | 12/2011 | Ogg et al. ..................... | 713/176 |
| 2011/0314290 | A1* | 12/2011 | Fort et al. ...................... | 713/176 |
| 2012/0089481 | A1* | 4/2012 | Iozzia et al. ............... | 705/26.41 |
| 2012/0124372 | A1* | 5/2012 | Dilley et al. ................... | 713/162 |

OTHER PUBLICATIONS

Ramzan, "Phishing Attacks and Countermeasures," Springer, "Handbook of Information and Communication Security," pp. 433-448, 2010.*
Parno et al., "Phoolproof Phishing Prevention," Springer-Verlag Berlin Heidelberg, 2006, pp. 1-19.*
Dasosta et al., "One-Time Cookies: Preventing Session Hijacking Attacks with Disposable Credentials," Georgia INstitute of Technology, 2011, pp. 1-17.*

(Continued)

*Primary Examiner* — Luu Pham
(74) *Attorney, Agent, or Firm* — Fox Rothschild, LLP; Robert J. Sacco

(57) ABSTRACT

A method and system are disclosed for detecting interference with a remote visual interface, such as a HTML webpage, at a client computer, particularly to determine if a malicious attack such as at HTML attack has occurred. When the web server receives a request for a page, a script is embedded in the page, and as a consequence the client computer requests at least one session key and at least one one time password from an enterprise server. The client computer also performs a check of the HTML interface present on the client computer, which an attack of this type would change. The result of the interface check, encrypted with the session key and one time password, is sent to the enterprise server, so that a comparison with the expected value for the website can be performed.

17 Claims, 3 Drawing Sheets

OTHER PUBLICATIONS

Powers et al., "Final Technical Report: Concurrent Information Assurance Architecture," Westone Technologies, Inc., Aug. 2002, pp. 16-70.*

Qi, F. et al, "Preventing Web-Spoofing with Automatic Detecting Security Indicator" [retrieved on 09 Mar. 2011] Retrieved from the Internet <URL: http://anyserver.cityu.edu.hk/weijia/2006/QiFana.pdf> published May 18, 2006 as per Internet Wayback Machine.

Utakrit, N., "A Review of Browser Extensions, a Man-in-the-Browser Phishing Techniques Targeting Bank Customers", Proceedings of the 7th Australian Information Security Management Conference, Dec. 1-3, 2009, Perth, Australia, pp. 110-119 [retrieved on Mar. 9, 2011] Retrieved from the Internet <URL: http://igneous.scis,ecu.edu.au/proceedings/2009/aism/AISMProceedings.pa> published Dec. 2009 as per front cover of document.

Guhring, P., 'Concepts against Man-in-the-Browser Attacks', [retrieved on Mar. 9, 2011] Retrieved from the Internet <URL: http://igneous.scis.ecu.edu.au/proceedings/2009/aism/AISMProceedings.pdf>published Dec. 2009 as per front cover of document.

Office Action mailed Jun. 30, 2011; Australian Patent Application Serial No. 2011200413 in the name of Symbiotic Technologies Pty Ltd.

Office Action mailed Mar. 10, 2011; Australian Patent Application Serial No. 2011200413 in the name of Symbiotic Technologies Pty Ltd.

* cited by examiner

METHODS AND SYSTEMS TO DETECT ATTACKS ON INTERNET TRANSACTIONS

CROSS REFERENCE TO RELATED APPLICATIONS

The present application claims priority to Australian Patent Application Serial No. 2011200413, filed Feb. 1, 2011, which is hereby incorporated by reference in its entirety.

TECHNICAL FIELD

The present invention relates to the detection of malicious attacks on network and web based transactions, particularly those using HTML and similar interfaces, and for which transaction and identity security is critical, for example internet banking.

BACKGROUND TO THE INVENTION

The internet is a valuable and pervasive tool of modern commercial and consumer activities. A wide range of services, including important business and financial services, can be controlled and delivered via the internet.

However, these activities also create opportunities for computer related fraud, identity theft, and other criminal activities. Banks and other financial institutions have proved a target of many types of attack, including for example phishing, key loggers, 'man in the middle' attacks, and malicious software including various Trojans.

The current best practice approach for securing user accounts over insecure networks is to utilise a combination of SSL encrypted communications, user names, passwords known to the user, and a variable password, provided by a technique such as an RSA token or a one time password delivered by SMS. This approach is generally adequate to protect against normal phishing, key logger type or 'man in the middle' attacks.

However, malicious attacks have evolved to new levels of sophistication. Some extant Trojans facilitate HTML based attacks, for example what are known as 'man in the browser' attacks. In this instance, when the user attempts to contact a known bank website, the Trojan substitutes or alters the log in screen. A typical HTML log in screen provided by the bank site may include fields for input of the username, password and RSA token password. In one form of attack, an additional field is provided for the user to complete, for example labelled as 'second token password'. The compromised interface sends the expected data to the internet banking server, which can operate and perform the required transaction as normal. The additional 'second token password' field value is not transmitted to the internet banking server, but is sent to an address designated by the malware originator. When coupled with the now known username and password, the second token value facilitates a new fraudulent transaction with the internet banking server. This may be completed by the fraudulent party immediately after the legitimate banking transaction is completed. This is only one example of many possible HTML based attacks. The key feature is that the HTML code is altered so that the customer at a remote computer does not see the interface exactly as intended by the bank, and that the changes assist in facilitating fraud.

One approach to detecting such attacks is to use a trusted software application on the client computer. Such an approach is disclosed, for example, in WO 2009/103742 by Boesgaard. However, in many cases it is not commercially acceptable or practical for a specific application to be resident on the client device.

It is an object of the present invention to provide a method and system to detect HTML based attacks at any client computer.

SUMMARY OF THE INVENTION

In a broad form, the present invention provides a script instruction on the secure website, which coupled with a session key provided by the secure website, enables verification of the key aspects of the client displayed page compared to the intended displayed page. If the aspects do not match, a probable malicious attack is indicated.

According to one aspect, the present invention provides a method for detecting interference with a remote visual interface at a client computer, comprising at least the steps of:

a web server receiving a request for a visual interface from the client computer;

the web server presenting the visual interface, comprising an embedded script;

an enterprise server creating a session key and one or more one time passwords, and sending these to the client computer, together with a script instructing the client computer to determine a first interface check message, said interface check message being characteristic of the displayed interface;

the enterprise server receiving first interface check message from the client computer encrypted with the session key and using the one time passwords;

the enterprise server comparing the first interface check message with a second interface check message, the second interface check message corresponding to the expected interface check message for the visual interface which was provided by the web server to the client computer;

If the first and second interface check messages do not correspond in a predetermined way, then the enterprise server sends a message indicating that the visual interface at the client computer is not consistent with the visual interface provided by said web server.

According to another aspect, the present invention provides a system to detect interference with a remote visual interface at a client computer, the system comprising a web server which operatively provides a visual interface to the client computer, the visual interface comprising a reference to a script, and an enterprise server, wherein the reference to the script is embedded in the visual interface and causes the client computer to link to the enterprise server, in response to which the enterprise server sends a session key, one or more one time passwords and a further script to the client computer;

the further script causing the client computer to determine a first interface check message, the interface check message being characteristic of the displayed interface, and to send the first interface check message to the enterprise server encrypted with the session key and using the one time password;

the enterprise server is adapted to compare the first interface check message with a second interface check message, the second interface check message corresponding to the expected interface check message for the visual interface which was provided by the web server to the client computer, and if the first and second interface check messages do not correspond in a predetermined way, then the enterprise server sends a message indicating that the interface at the client computer appears to have been interfered with.

According to another aspect, the present invention provides a method for detecting interference with a remote visual interface at a client computer, comprising at least the steps of:
a web server receiving a request for a visual interface from the client computer;
the web server presenting the visual interface, comprising a reference to a script instructing the client computer to send a request to an enterprise server;
the enterprise server creating at least first and second session keys and one or more one time passwords, and sending these to the client computer by way of a script, the script instructing the client computer to determine a first and a third interface check message, said first and third interface check messages being respectively characteristic of the displayed visual interfaces at page load and at form submission;
the enterprise server determining second and fourth interface check messages, determined from the visual interfaces provided by the web server, being the visual interfaces expected at page load and at form submission;
the enterprise server receiving the first interface check message from the client computer encrypted with the first session key and using one of said one time passwords, and the third interface check message encrypted with the second session key and another one of said one time passwords;
the enterprise server comparing the first interface check message with the second interface check message, and if they do not correspond in a predetermined way, then the enterprise server sends a message indicating that the visual interface at the client computer is not is not consistent with the visual interface provided by said web server at the time of page loading;
the enterprise server comparing the third interface check message with the fourth interface check message, and if they do not correspond in a predetermined way, then the enterprise server sends a message indicating that the visual interface at the client computer is not consistent with the visual interface provided by said web server at the time of form submission.

BRIEF DESCRIPTION OF THE DRAWINGS

Illustrative embodiments of the present invention will now be described with reference to the accompanying figures, in which.

DETAILED DESCRIPTION

Figure 1:
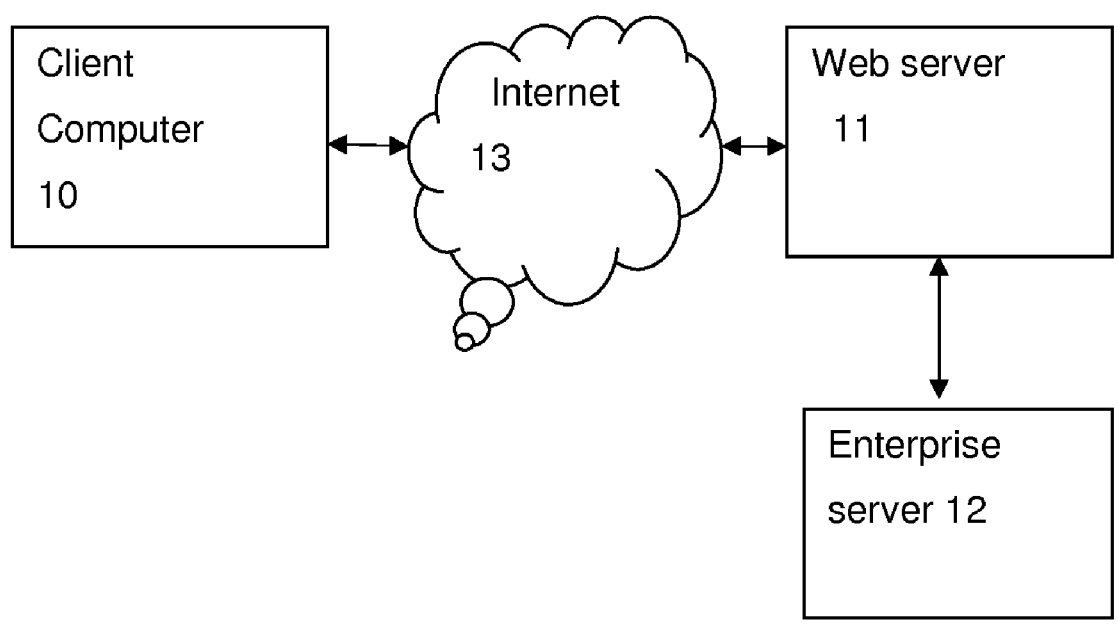
FIG. 1 is a general block diagram illustrating the access scheme.

The present invention will be described with reference to a particular illustrative example. It will be appreciated that the present invention will be implemented in particular systems so as to use and cooperate with the existing or intended software and architecture, and that accordingly corresponding changes in implementation and features are to be expected. New software languages and techniques would be expected to alter the implementation of the present invention. The examples and suggestions provided are intended to be illustrative and explain the scope and application of the present invention, but are not to be interpreted as limitative of the invention.

The following definitions will be used for the purposes of the specification and claims.

Client computer: May be any kind of user device, for example PC, tablet computer, smartphone, iPhone, Android, Blackberry, Palm, or any device whatsoever adapted to access the internet and perform a transaction with the secure server. It may use any operating system or browser.

Browser: Any software interface which enables access or viewing of pages or similar visual representations via the internet or a network (as defined below). It is not limited to HTTP or similar protocols.

Internet: Whilst comprising the publicly accessible internet, the term is intended to comprise any private or public network operating on HTTP or any other protocol. It is intended to encompass, for example, internal, private or shadow networks operating on proprietary protocols to provide similar facilities to users.

Session Key: A cryptographic key, generally asymmetrical, which is operative for only one set of interactions (for example one login) between the server and a client computer.

One time Password: A password which is operative only once, a new password being required for any subsequent login.

Script: A set of instructions, which in this context is embedded in the website instructions, which can be executed by the client computer. It is preferably a platform independent language such as java or vb script.

Malware—in this context, any software or code inserted onto the client computer by any means, which is intended to compromise the integrity of the secure connection or capture personal details, or otherwise act in a malicious way. This is intended as an expansive term. It comprises, for example, Man-in-the-Middle, Man-in-the-Browser, Trojans viruses, worms, and keyloggers. Examples of current malware are Zeus, Meboot, Gozi, Carberp, Spyeye, Silon and Bugat.

TDz script: This is the script of the implementation of the present invention described below.

Page: in this context, any screen that is rendered from raw data on a client through a describing language. That data can contain capabilities for code execution, such as a scripting language. One example could be a website described using HTML. Another example would be an Adobe Postscript form.

Characteristic Value: a string that represents the elements of the page according to an implementation of the present invention. It is an example of an interface check message. The illustrative Characteristic Value is determined by traversing through all elements of a page and creating an encrypted value for each element (using the session key, One Time Password and other inputs as password for the encryption). All the individual encrypted values are then combined to an overall characteristic value of the page in this example.

FIG. 1 illustrates the general arrangement of a typical access arrangement for a client wishing to access a secure, remote server via the internet. A typical example for usage is internet banking, and this will be used to facilitate the following description. However, it will be understood that the present invention is not limited to this specific application. Client computer 10 connects to the internet 13. Client computer seeks to connect to internet banking server 11, for example via a suitable URL. In addition to connections to the internet (and to other components of the banking system, which are not relevant here) internet banking server communicates via a secure connection to enterprise server 12.

The present invention may, in one form, be implemented generally as follows. For the purposes of this discussion, it is assumed that the internet banking webpage is delivered correctly to the browser at the client computer, and that some malicious component within the browser (or somewhere in the kernel) changes the displayed webpage after it is decrypted from the SSL/HTTPS connection.

On the bank website, a set of instructions in java script is provided, which is downloaded with the website code (HTML, Java, etc) when the client seeks to access the internet baking interface. This code is inherently visible and open to inspection by anyone accessing the site, including the designers of malware.

An additional server, the enterprise server, generates a session key, which is sent in the clear to the client computer when access is requested. Additionally, the enterprise server generates one or more one time passwords which are sent in the clear.

The java script carries out a specific, detailed check of the elements of the website as displayed on the client machine, and so produces an interface check message. This may be generated to various levels of complexity using many different techniques, as selected by the software designer in a particular application. The main objective of the interface check message is to provide a check that the page displayed corresponds to an intended page, in a form which cannot be readily defeated by the malware designer. In the illustrative implementation, the interface check message may be the characteristic value. The enterprise server, for example by interrogating the internet banking server or through some other pre-configured way, receives or calculates the characteristic value that is expected for the elements of website at the client.

There is no value to the malware designer in capturing the one time passwords and session keys, as by their nature they can only be used once. These are used to send the characteristic value, and such other information as is desired as will be explained further below (for example sufficient to identify the client computer).

The enterprise server compares the characteristic value from the client with the expected value. If there is any discrepancy, the enterprise server indicates that the client computer appears to have been compromised, for example by a 'man in the browser' or other HTML based attack. The bank or other website operator may take such action in response as it deems appropriate or is agreed with the customer. This may include denial of any access, limiting access, preventing certain types of transactions, or any other response suitable to the circumstances. It may be used solely for collecting statistics on suspected attacks, or assessing the extent of risk of such attacks.

The present invention is concerned with detecting probable attacks, and providing an indication to that effect. It is not concerned with the detail of the response, if any, the bank chooses in response to that detection.

In particular, the present implementation does not in itself prevent or control access to particular websites, or determine what does and does not operate.

The present invention is not intended to prevent all possible attacks. It is intended to be used in conjunction with technologies such as SSL, RSA tokens and other existing technologies, not to replace them.

A particular advantage of the approach of the present invention is that the java script is delivered as part of the webpage. Thus, no special measures or software are required at the client computer—the detection is provided using the servers and the java script. On the other hand, the implementation of the present invention needs to take account that if there is a problem to detect, the client computer is under the control of the malware and therefore the implementation must prevent the malware from just imitating the java script to send back a "correct" hash or characteristic value. Moreover, in a practical implementation it is necessary to ensure that the malware does not just send the "correct" hash back to the server even though the page was changed, for example by waiting until after an initial verification has been performed.

Figure 2:
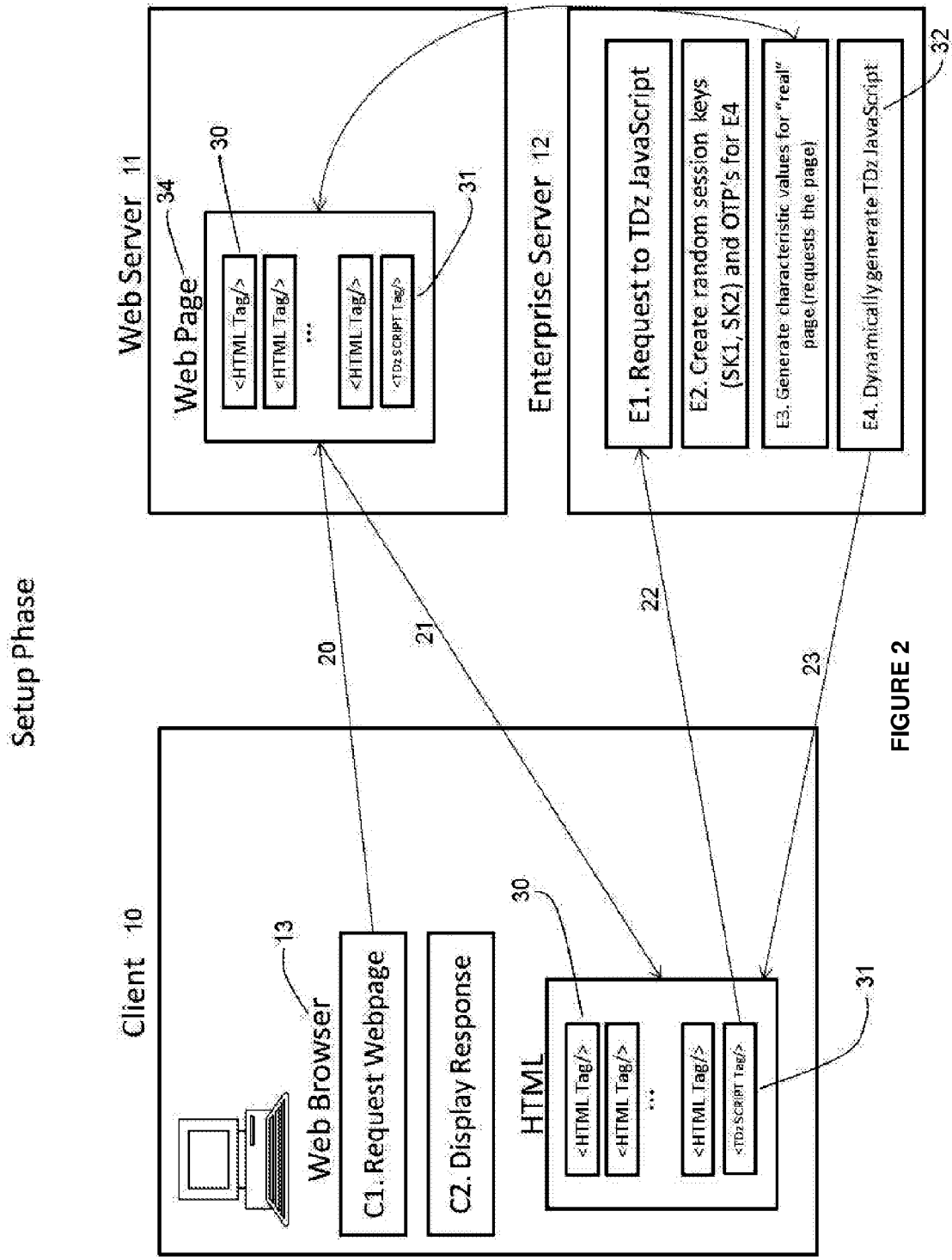
FIG. 2 is a block diagram illustrating the set up process according to one aspect of the present invention.
Figure 3:
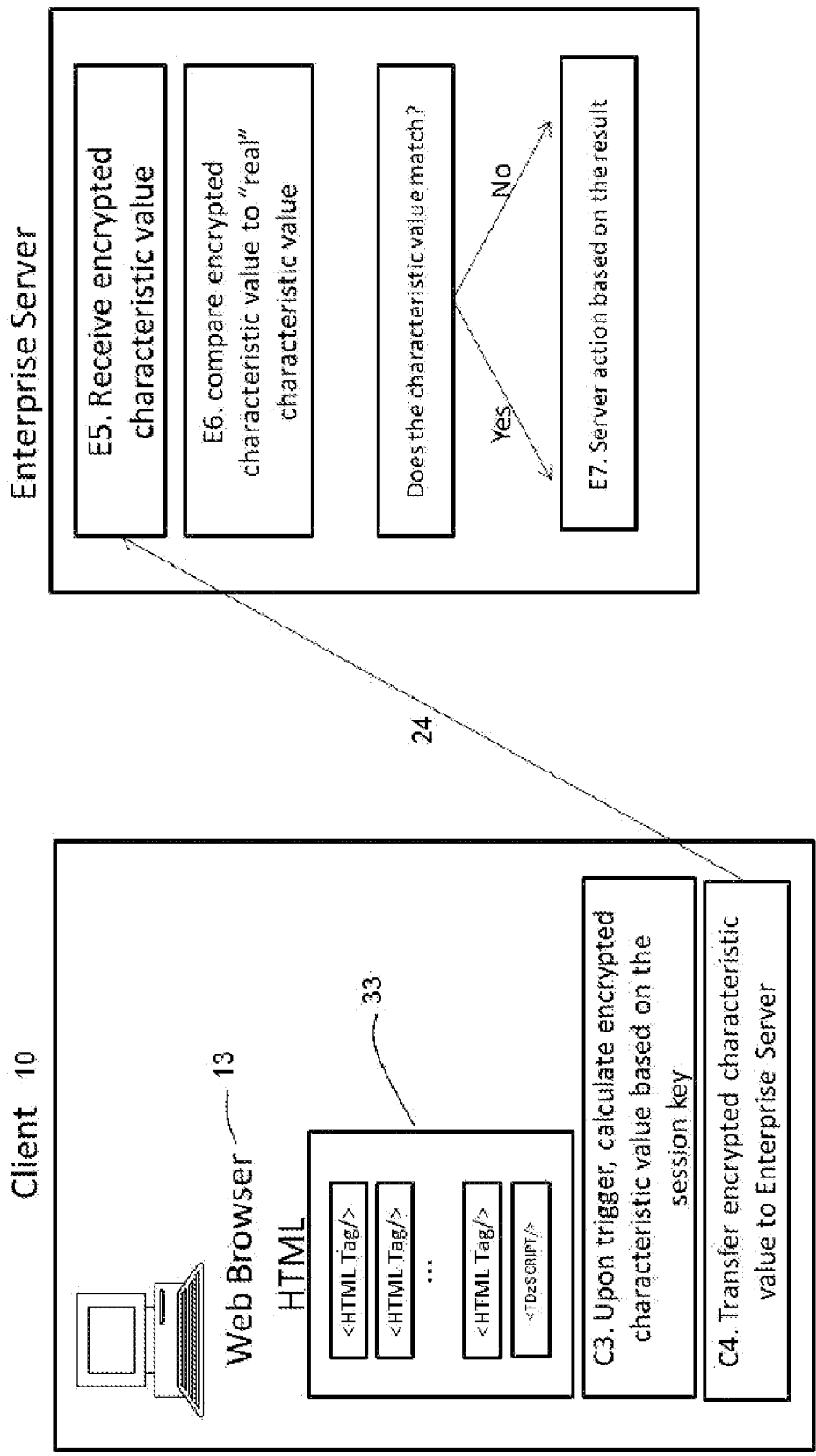
FIG. 3 is block diagram illustrating the verification process according to one aspect of the present invention.

FIGS. 2 and 3 illustrate in more detail one implementation of the present invention. FIG. 2 is concerned with the set up phase of the process; FIG. 3 illustrates the verification phase.

Referring to FIG. 2, it can be seen that the client 10, web server 11 and enterprise server 12 are shown as discrete blocks. The steps in each block are illustrated as well as the communication steps, shown as arrows, between the blocks.

The set up phase begins with client 10 at step C1 requesting a webpage, for example the login page of a website. This request 20 is sent to the web server 11. Web server 11 responds with the appropriate webpage HTML 34 in communication 21.

At step C2, client 10 displays the content defined by the HTML sent from the web server 11. It can be seen that HTML includes many HTML tags 30, and a reference to TDz script 31. This reference to the TDz script 31 instructs web browser 13 to execute a request 22 to the enterprise server 12. This request is received at step E1 by enterprise server 12. In response to E1, at E2, enterprise server 12 creates random session keys (SK1, SK2) and one time passwords (OTPs) for the characteristic value method and the dynamic JavaScript. The purpose of the OTPs is to ensure that every TDz JavaScript 32 will be slightly different, so as to ensure that it is not possible for another party to "precalculate" the values to be sent in response (which will be explained further below). At E4, the TDz JavaScript 32 is generated, including the OTPs and session keys SK1, SK2. This is then sent to the client 10.

In an alternative implementation, the TDz JavaScript may be downloaded together with the original HTML, rather than in response to a separate request. In this case the Web Server 11 would have to ensure it can return the correct content directly as part of the webpage 32.

Additionally, enterprise server has at E3 generated the characteristic value from the correct web page by requesting this page from web server 11 or by other means such as being provided by the correct website manually, through an API or by accessing it, and then determining the characteristic value for the correct page.

The characteristic value is preferably determined by examining the number and/or values of specific content elements in the HTML.

The Characteristic Value is a fingerprint that represents all the content elements of a page. One way to determine the Characteristic Value is by traversing through all elements that make up a page and creating individual fingerprints for each element. For each individual element, an individual fingerprint is generated. This individual fingerprint can (and will) also include the session keys and the OTPs to make it more secure. One implementation could be to encrypt the full content element with the session key as password and then apply some hashing algorithm (such as SHA-1) to produce an individual fingerprint. The Characteristic Value will now be calculated by concatenating all sorted individual fingerprints and then apply some hashing algorithm (such as SHA-1).

For example: If a page has two content elements <A HREF='link.html'>text</A> and <INPUT TYPE=SUBMIT NAME=submit>. And let's assume the individual fingerprints are calculated as 16163e5d2c160432d87a457ad8fbd607732ab0a4 and 63b12d62e27c6cb242cef0f3cb8021da53393b44 from a provided sessionkey and OTP. The characteristic value is then (assuming SHA-1 will be used as an hashing algorithm): SHA1("16163e5d2c160432d87a457ad8fbd607732ab0a463 b12d62e27c6cb242ce f0f3cb8021da53393b44")= f7d99cceb9e1c4700bc6ea829ddf69cc90afa984.

The reason for concatenating a sorted list of the individual fingerprints is to ensure that the order of the content elements is not significant. This is because when going through a page, you may get the elements in different orders, such as the element 1 first and then element 2 second, then the next time element 2 may be first and element 1 second.

It will be appreciated that the specific detail of the number of elements in a page will vary with the page design, and with the scripting language, and so the implementation of the characteristic value will vary accordingly.

While each characteristic value is different for each session key and OTPs, it is obviously the same if the session key and the OTPs are the same. This is how the Enterprise Server will verify the characteristic value from the client. It knows the session key and the OTPs and therefore can calculate the correct characteristic value and compare it with the presented one.

Enterprise server 12 has now characteristic values for the random session keys values (CV1(SK1), CV2(SK2)), and the client 10 has TDz JavaScript 32 including the both the session keys and the OTPs.

It is now possible to undertake a verification, as explained with reference to FIG. 3. TDz JavaScript 32 has been returned to the web browser 13 of client 11. When a trigger is received at C1, it can calculate a characteristic value for the web page 33 as displayed at the client 10. Triggers may be selected as appropriate for the website, but it may typically be triggered upon page load and form submission (e.g. if you click on login at a bank or other site). It is preferred that the trigger and characteristic value calculation is not a one off process when the page is first loaded, as the malware may be set to only operate after an initial verification.

According to this implementation, CV1 is calculated at the time of page loading, and CV2 is calculated at the time the page is exited, for example form submission.

TDz JavaScript 32, after triggering at C3, calculates a characteristic value for the webpage 33, using the identical process to that described above. The values are designated as CV3 and CV4, and they are respectively encrypted using SK1 and SK2.

At C4, this value of CV3, encrypted with a password dependant on SK1, is sent to the enterprise server, together with additional information (such as the session key SK1 or one of the OTPs).

At E5, the enterprise server receives the encrypted characteristic value CV3(SK1). At E6, this is compared with CV1(SK1). Alternatively, the values to be compared may be CV4(SK2) and CV2(SK2).

The present invention is concerned with the process of detecting that a HTML attack has taken place. The action to be taken in response at step E7 does not strictly form part of the present invention, and may be anything which is deemed appropriate by the website operator, having regard to the nature of the website, as has been discussed above.

Whilst the present invention has been described with reference to a separate enterprise server, this may be merely a logical distinction, and all functions of the web server and the enterprise server could be performed on a single server. On the other hand, the enterprise server may be comprised of multiple physical machines and may also reside on the same physical machine as the web server or banking server. Similarly, it is not necessary for the communication steps which are described in the example as going to the enterprise server to be sent there directly. The communication could be sent to the web server, which will forward this to the enterprise server.

The present invention describes a reference to the TDz script 31 which triggers the web browser 13 to download and execute the TDz script 32. However this invention is not limited by this approach and the TDz script 32 could be returned directly to the web browser 13 (without the reference 31), for example if the enterprise server 12 and the web server 11 are integrated.

It will also be understood that, depending upon the implementation selected and the detail of the process, different numbers of session keys may be required. In general, if there are two possible triggers for the verification process, two session keys should be generated. In an implementation with only one trigger, one key is required: for three triggers, 3 keys, and so forth. The number of triggers required will depend in part upon the function of the pages to be protected.

It will be understood that while the discussion has centred around protecting a particular page, the invention could be applied to multiple pages within a website if required.

The disclosures of all references cited herein are hereby incorporated by reference into the specification. None of these references should be construed as constituting part of the common general knowledge in the art.

It will be appreciated that the present invention may be implemented in many different ways in many different systems, and that accordingly, many variations and additions would be expected in any practical implementation.

The invention claimed is:

1. A method for detecting interference with a remote visual interface at a client computer, comprising at least the steps of:
   receiving, by a web server, a request for a visual interface from the client computer;
   presenting, by the web server, the visual interface, comprising an embedded script;
   creating, by an enterprise server, a session key and one or more one time passwords, and sending the session key and the one or more one time passwords to the client computer, together with a script instructing the client computer to determine a first interface check message, said interface check message being a string representing content elements of the displayed interface;
   receiving, by the enterprise server, first interface check message from the client computer encrypted with the session key and using the one time passwords;
   comparing, by the enterprise server, the first interface check message with a second interface check message, the second interface check message corresponding to the expected interface check message for the visual interface which was provided by the web server to the client computer;
   if the first and second interface check messages do not correspond in a predetermined way, then sending by the enterprise server a message indicating that the visual interface at the client computer is not consistent with the visual interface provided by said web server.

2. The method according to claim 1 wherein each of said interface check messages is determined at least in part by examining the specific elements of the respective visual interface.

3. The method according to claim 2, wherein each of said respective visual interfaces is described in a HyperText Markup Language ("HTML"), and each of said interface check messages is determined by hashing of individual elements of the respective visual interface to derive a set of fingerprints, and a hash of the thereby derived set of fingerprints.

4. The method according to claim 1, wherein the enterprise server and web server are located on the same physical device.

5. The method according to claim 1, wherein the enterprise server compares the encrypted value of the first and second interface check messages.

6. The method according to claim 1, wherein additional interface check messages are generated at specific stages in the client operation of the visual interface, and compared with corresponding expected interface check messages.

7. The method according to claim 1, wherein the embedded script instructs the client computer to send a request to the enterprise server, and in response to receiving said request the enterprise server carries out the step of creating a session key and one or more one time passwords, and sending the session key and the one or more one time passwords to the client computer.

8. A system to detect interference with a remote visual interface at a client computer, the system comprising:
   a web server computer which operatively provides a visual interface to the client computer, the visual interface comprising a reference to a scrip; and
   an enterprise server computer;
   wherein the reference to the script is embedded in the visual interface and causes the client computer to link to the enterprise server computer, in response to which the enterprise server computer sends a session key, one or more one time passwords and a further script to the client computer;
   wherein the further script causes the client computer to determine a first interface check message, the interface check message being a string representing content elements of the displayed interface, and to send the first interface check message to the enterprise server computer encrypted with the session key and using the one time password;
   wherein the enterprise server computer is adapted to compare the first interface check message with a second interface check message, the second interface check message corresponding to the expected interface check message for the visual interface which was provided by the web server computer to the client computer, and if the first and second interface check messages do not correspond in a predetermined way, then the enterprise server computer sends a message indicating that the visual interface at the client computer is not consistent with the visual interface provided by said web server computer.

9. The system according to claim 7, wherein each of the interface check messages is determined at least in part by examining the specific elements of the respective visual interface.

10. The system according to claim 9, wherein the visual interface is described in a HyperText Markup Language ("HTML"), and each of the first and second interface check messages is determined by hashing of individual elements of the respective corresponding visual interface to derive a set of fingerprints, and a hash of the thereby derived set of fingerprints.

11. The system according to claim 8, wherein the enterprise server computer and website server computer are located on the same physical device.

12. The system according to claim 8, wherein additional interface check messages are generated at specific stages in the client operation of the visual interface, and compared with corresponding expected interface check messages.

13. A method for detecting interference with a remote visual interface at a client computer, comprising at least the steps of:
   receiving, by a web server, a request for a visual interface from the client computer;
   presenting, by the web server, the visual interface, comprising a reference to a script instructing the client computer to send a request to an enterprise server;
   creating, by the enterprise server, at least first and second session keys and one or more one time passwords, and sending the session key and the one or more one time passwords to the client computer by way of a script, the script instructing the client computer to determine a first and a third interface check message, said first and third interface check messages being respectively strings representing content elements of the displayed visual interfaces at page load and at form submission;
   determining, by the enterprise server, second and fourth interface check messages, determined from the visual interfaces provided by the web server, being the visual interfaces expected respectively at page load and at form submission;
   receiving, by the enterprise server, the first interface check message from the client computer encrypted with the first session key and using one of said one time passwords, and the third interface check message encrypted with the second session key and another one of said one time passwords;
   the enterprise server comparing the first interface check message with the second interface check message, and if the first interface check message and the second interface check message do not correspond in a predetermined way, then sending by the enterprise server a message indicating that the visual interface at the client computer is not is not consistent with the visual interface provided by said web server at the time of page loading;
   comparing, by the enterprise server, the third interface check message with the fourth interface check message, and if the third interface check message and the fourth interface check message do not correspond in a predetermined way, then sending by the enterprise server a message indicating that the visual interface at the client computer is not consistent with the visual interface provided by said web server at the time of form submission.

14. The method according to claim 13 wherein each of said first, second, third and fourth interface check messages is determined at least in part by examining the specific elements of the respective corresponding visual interface.

15. The method according to claim 14, wherein the visual interface is described in a HyperText Markup Language ("HTML"), and each of said first, second, third and fourth interface check messages is determined by hashing of individual elements of the respective corresponding visual interface to derive a set of fingerprints, and a hash of the thereby derived set of fingerprints.

16. The method according to claim 13, wherein the enterprise server and web server are located on the same physical device.

17. The method according to claim 13, wherein the enterprise server compares the encrypted value of the first and second interface check messages, and/or the encrypted value of the third and fourth interface check messages.

* * * * *